(No Model.)
G. F. BROTT.
FOOD BLOCK FOR ANIMALS.
No. 422,370. Patented Mar. 4, 1890.
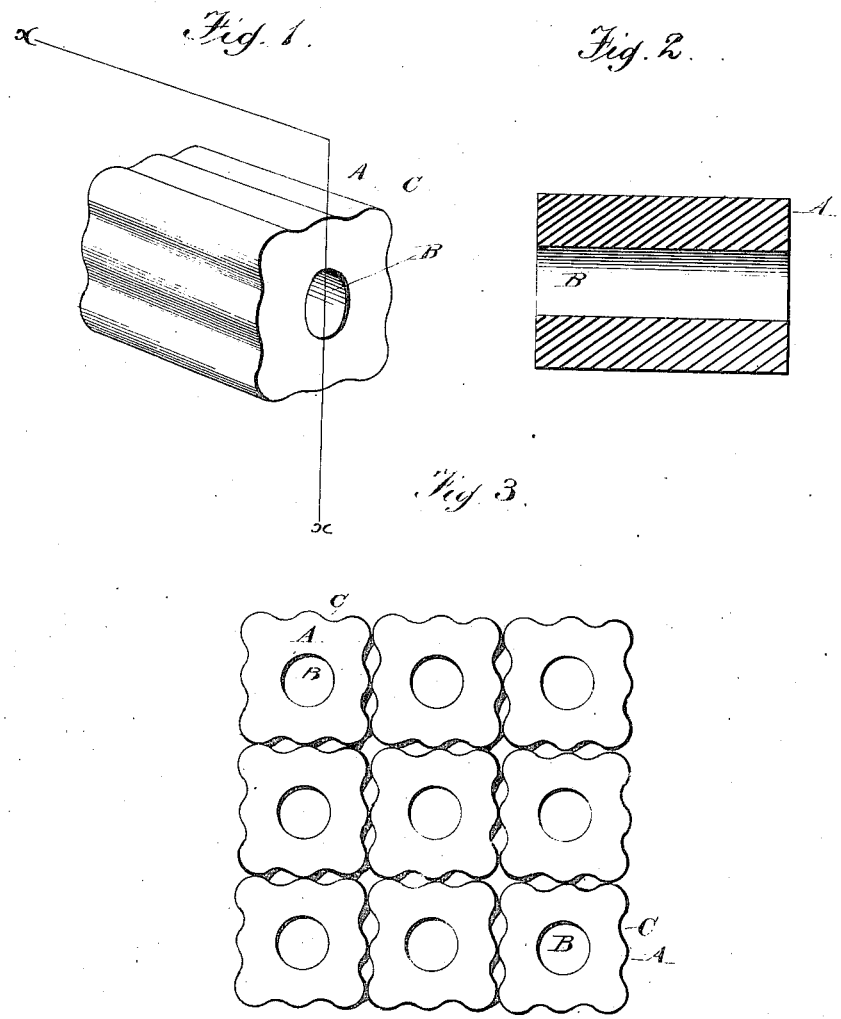

UNITED STATES PATENT OFFICE.

GEORGE F. BROTT, OF WASHINGTON, DISTRICT OF COLUMBIA, ASSIGNOR OF ONE-HALF TO F. C. BAILEY, OF BALTIMORE, MARYLAND.

FEED-BLOCK FOR ANIMALS.

SPECIFICATION forming part of Letters Patent No. 422,370, dated March 4, 1890.

Application filed November 30, 1888. Serial No. 292,275. (No specimens.)

*To all whom it may concern:*

Be it known that I, GEORGE F. BROTT, a citizen of the United States, residing at Washington, in the District of Columbia, have invented certain new and useful Improvements in Animal-Feed Blocks; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in the manner of putting up food for animals; and it has for its object the production of food-blocks which will occupy but comparatively small space in shipment or storage, which will not be liable to damage by mold, and which will be convenient in use.

The invention will first be described in connection with the accompanying drawings, and then pointed out in the claim.

Figure 1 represents a block or brick of animal food formed in accordance with my invention. Fig. 2 is a longitudinal section therethrough, taken on the line X X of Fig. 1. Fig. 3 represents a number of the bricks or blocks as they appear when packed for transportation or storage.

Before proceeding to describe my invention I will, in order to make the purpose of said invention more easily understood, describe the ingredients I preferably use in forming the animal feed above referred to and the method I employ in mixing the same. To this end I preferably use the following-named ingredients in the quantities named, viz: bran, five parts; potatoes or ground oats, two parts; ground corn, two parts; cotton or linseed oil cake meal, one part, as I have found the same to be the best producers of fat, bone, and muscle, and I place the same in any approved mixing apparatus, and there subject them to thorough agitation and to the action of steam, or mix a little water with said ingredients and subject them to a dry heat, or to any other desired treatment, whereby the starchy properties inherent in the several substances are partially developed to form an adhesive substance, whereby the component parts of the mixture are held together.

After being treated as above set forth, the mixture is placed in a compressing-machine of any desired character, and there formed into blocks or bricks of the requisite density and of size sufficient to form a suitable quantity for one feed of a horse, cow, or other animal. After compression, the block or brick should be placed in a kiln and then subjected to the action of dry heat, that it may be quickly and thoroughly dried.

I will now describe the precise character of my invention.

Referring to the drawings, A designates a block or brick of animal feed, having its central portion removed, as shown at B, and its side surfaces corrugated, as shown at C, either by the compressing-machine or by a process separate therefrom, for the purpose of permitting a free circulation of air to all parts of the block or brick when the same is packed for transportation or storage, as shown by Fig. 3.

It will be readily apparent that because of the corrugated or fluted surfaces of the blocks contact therebetween when the blocks are packed in the manner shown in Fig. 3 while sufficient for practical purposes is yet very slight, inasmuch as they only are in contact at the immediate central portion of the crowns of the outwardly-curved portions of the blocks, whereby air has free access to almost the entire exterior surfaces of the blocks. It is also apparent that contact between the blocks may be further decreased by arranging them at right angles to each other when packed.

It will be understood that the aperture or corrugations may extend transversely of the block, if desired, in lieu of the manner shown.

For use, the block or brick is immersed in water, and thereby softened; and here the central perforation, aside from allowing a free passage of air through the block, serves another very useful purpose—that is to say, it permits the absorption of water from the inner side of the block, and in this manner more thoroughly and expeditiously puts the food in good condition for use.

It will be apparent that a block or brick of animal feed formed as above set forth will possess advantages not possessed by those not having a similar configuration, among which may be mentioned ease of transportation, packing, storing, and use, as well as its freedom from mold, moisture, &c., through the free circulation of air to all parts thereof.

I claim—

A food-package consisting of a quantity of food for animals pressed into a block, said block having a central perforation and corrugated exterior surfaces, substantially as described, and for the purposes set forth.

In testimony whereof I affix my signature in presence of two witnesses.

GEORGE F. BROTT.

Witnesses:
 OCTAVIUS KNIGHT,
 ALBERT WOOD.

It is hereby certified that the name of the assignee in Letters Patent No. 422,370 granted March 4, 1890, upon the application of George F. Brott, of Washington, District of Columbia, for an improvement in "Feed-Blocks for Animals," was erroneously written and printed "F. C. Bailey"; that said name should have been written and printed *T. C. Bailey*, and that the said Letters Patent should be read with this correction therein that the same may conform to the record of the case in the Patent Office.

Signed, countersigned, and sealed this 18th day of March, A. D. 1890.

[SEAL.]

CYRUS BUSSEY,
*Assistant Secretary of the Interior.*

Countersigned:
C. E. MITCHELL,
*Commissioner of Patents.*